United States Patent
Wei (10) Patent No.: US 10,103,620 B1
(45) Date of Patent: Oct. 16, 2018

(54) SIBO BOOST CONVERTER AND OPERATION METHOD THEREOF

(71) Applicant: BravoTek Electronics Co., Ltd., Zhubei, Hsinchu County (TW)

(72) Inventor: Wei-Hsin Wei, Zhubei (TW)

(73) Assignee: BravoTek Electronics Co., Ltd., Zhubei (TW)

( * ) Notice: Subject to any disclaimer, the term of this patent is extended or adjusted under 35 U.S.C. 154(b) by 0 days.

(21) Appl. No.: 15/788,599

(22) Filed: Oct. 19, 2017

(51) Int. Cl.
*G06F 1/20* (2006.01)
*H02M 3/04* (2006.01)
*G09G 3/3225* (2016.01)

(52) U.S. Cl.
CPC ............ *H02M 3/04* (2013.01); *G09G 3/3225* (2013.01); *G09G 2330/02* (2013.01)

(58) Field of Classification Search
CPC .................................. H02M 3/04; G05F 1/20
USPC ................................ 323/234, 282–289, 315
See application file for complete search history.

(56) References Cited

U.S. PATENT DOCUMENTS

| | | | |
|---|---|---|---|
| 6,132,362 A * | 10/2000 | Tepper | A61N 2/02 600/14 |
| 6,166,527 A | 12/2000 | Dwelley et al. | |
| 6,801,028 B2 * | 10/2004 | Kernahan | H02M 3/156 323/283 |
| 7,327,124 B2 | 2/2008 | Liu et al. | |
| 7,812,579 B2 * | 10/2010 | Williams | H02M 3/07 323/222 |
| 8,089,323 B2 * | 1/2012 | Tarng | H03B 5/04 330/127 |
| 8,335,091 B2 * | 12/2012 | Greenfeld | H02M 3/3376 363/132 |
| 8,648,583 B2 * | 2/2014 | Brown | H02M 1/38 323/282 |
| 8,907,642 B1 * | 12/2014 | Burstein | H02M 3/1584 323/272 |
| 9,685,502 B2 * | 6/2017 | Wood | H01L 29/0615 |

(Continued)

OTHER PUBLICATIONS

Chang-Seok Chae, et al., "A Single-Inductor Step-Up DC-DC Switching Converter With Bipolar Outputs for Active Matrix OLED Mobile Display Panels", IEEE Journal of Solid-State Circuits, vol. 44, No. 2, Feb. 2009, pp. 509-524.

(Continued)

*Primary Examiner* — Adolf Berhane
*Assistant Examiner* — Nusrat Quddus
(74) *Attorney, Agent, or Firm* — Innovation Capital Law Group, LLP; Vic Lin (57) ABSTRACT

In a SIBO boost converter, an inductor current flows from an input to ground through an inductor and a first switch to energize the inductor. The inductor releases energy stored thereof and the inductor current flows from the inductor to ground via a second switch and a first capacitor to charge the first capacitor and to produce a first positive output thereon. The inductor is energized by the input and the inductor current flows from the inductor to a third capacitor through two third switches to charge the third capacitor and to produce a second positive output thereon. The third capacitor is discharged through two fourth switches to charge a second capacitor of the capacitors to produce a negative output thereon. Timing for producing the second positive output is non-overlapped with timing for producing the negative output.

14 Claims, 8 Drawing Sheets

(56) References Cited

U.S. PATENT DOCUMENTS

| | | | |
|---|---|---|---|
| 2008/0055946 A1 | 3/2008 | Lesso et al. | |
| 2011/0267142 A1* | 11/2011 | Wismar | H02M 3/157 330/129 |
| 2014/0232189 A1* | 8/2014 | Gasparini | H02M 3/1584 307/31 |
| 2014/0371931 A1* | 12/2014 | Lin | H02S 10/00 700/287 |
| 2015/0263601 A1* | 9/2015 | Chen | H02M 1/14 323/271 |
| 2015/0303806 A1* | 10/2015 | Madsen | H02M 7/5383 323/271 |
| 2016/0005732 A1* | 1/2016 | Wood | H01L 29/1004 257/134 |
| 2016/0079860 A1* | 3/2016 | Shook | H02M 3/158 327/112 |
| 2017/0099011 A1* | 4/2017 | Freeman | H02M 7/06 |
| 2017/0212399 A1* | 7/2017 | Tarng | E06B 7/10 |
| 2017/0244318 A1* | 8/2017 | Giuliano | H02M 3/07 |
| 2017/0287721 A1* | 10/2017 | Wood | H01L 21/3063 |
| 2018/0172869 A1* | 6/2018 | Candy | G01V 3/10 |

OTHER PUBLICATIONS

Richtek Technology Corporation, "Power Solution for Wearable AMOLED Products", Feb. 2016, www.richtek.com, 10 pages.
Richtek Technology Corporation, "Triple Output AMOLED Bias", Mar. 2016, www.ricktek.com, 14 pages.
Texas Instruments, "Single-Inductor, Multiple-Output (SIMO) Regulator for AMOLED", SLVS831A—Apr. 2008—Revised Jul. 2008, 21 pages.
Texas Instruments, "TPS65132 Single Inductor—Dual Output Power Supply", SLVSBM1H—Jun. 2013—Revised Nov. 2016, 67 pages.
Texas Instruments, "TPS65135 Single-Inductor, Multiple-Output Regulator", SLVS704C—Nov. 2011—Revised Jan. 2017, 27 pages.

* cited by examiner

SIBO BOOST CONVERTER AND OPERATION METHOD THEREOF

TECHNICAL FIELD

The disclosure relates in general to a new SIBO (Single Inductor Bipolar Output) boost converter and an operation method thereof.

BACKGROUND

Mobile systems and displays demand efficient and longer battery usage. Additionally, display quality is the most important performance feature that cannot be compromised even during heavy load current fluctuation, associated large drop-out voltage transition due to it and switching noise from the employed DC (direct current)-DC converters.

The active matrix OLED (AMOLED) display becomes very popular for mobile display applications owing to its advantages such as high display quality, low power consumption and low material cost. The AMOLED panel usually requires both positive and negative power suppliers with different regulated voltages, which are related to each display panel load. Each panel has different output current and voltage levels requirements based on the application such as panel size, pixel numbers, display quality, adopted process generation, and the like.

Figure 1:
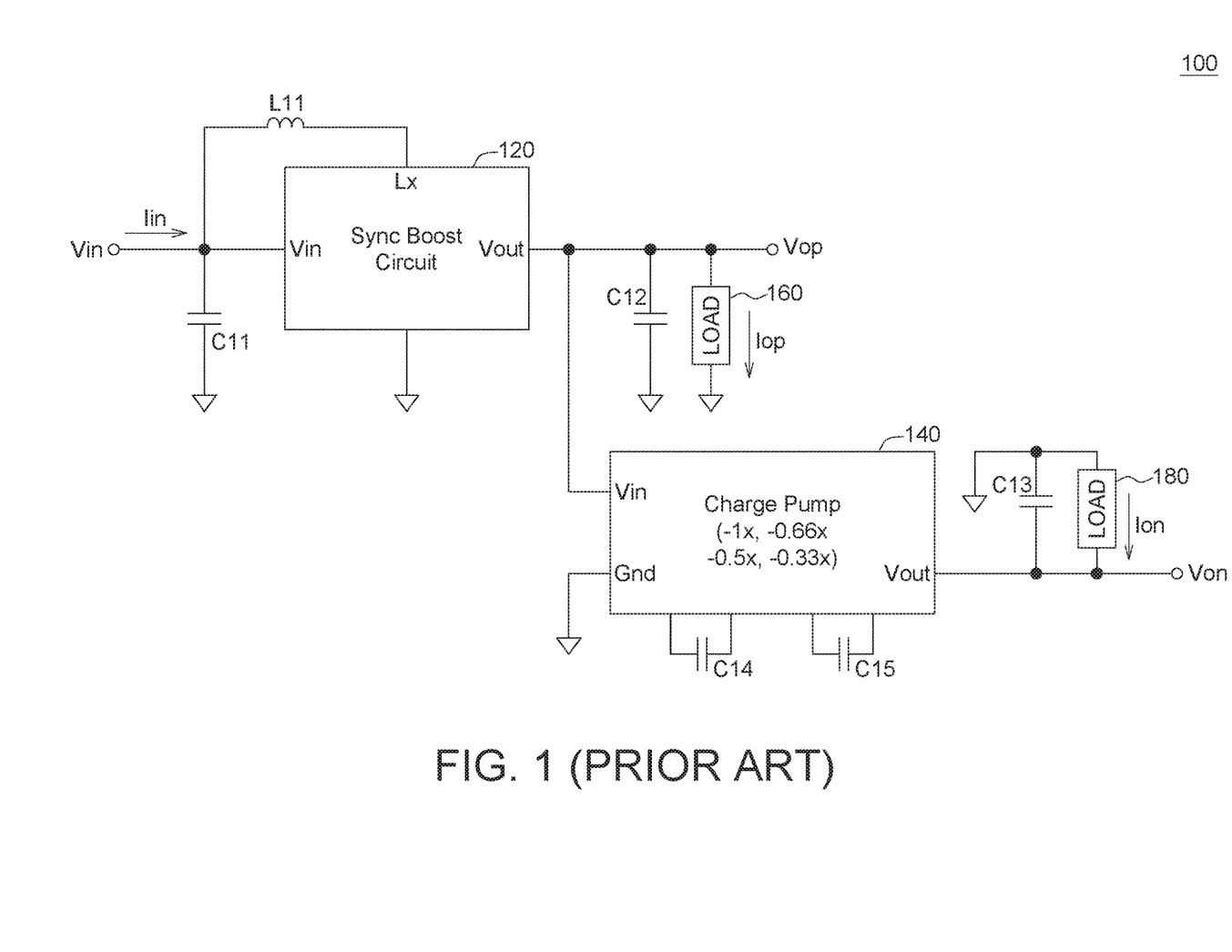
FIG. 1 (prior art) shows a conventional two-stage SIBO converter.

FIG. 1 shows a conventional single inductor AMOLED power supply, which is a two-stage SIBO converter. As shown in FIG. 1, the conventional two-stage SIBO converter 100 includes a synchronous boost circuit 120, a charge pump 140, an inductor L11 and capacitors C11-C15. The capacitors C11-C13 are decoupling capacitors. The capacitors C14-C15 are fly capacitors. The conventional two-stage SIBO converter 100 generates a positive output Vop for driving the load 160 by the current Iop, and a negative output Von for driving the load 180 by the current Ion. The input provides the input voltage Vin and the input current Iin.

The synchronous boost circuit 120 is configured to boost the input Vin to the positive output Vop.

The charge pump 140 is configured to generate the negative output Von from the positive output Vop. The charge pump 140 has four steps, i.e. −1×, −0.66×, −0.5× and −0.33×. By using the fly capacitor C14, the charge pump 140 may implement the step −1×, that is, Von=Vop*(−1). By using the fly capacitors C14 and C15, the charge pump 140 may implement the steps −0.66×, −0.5× and −0.33×, that is, Von=Vop*(−0.66), or Von=Vop*(−0.5) Von=Vop*(−0.33).

From FIG. 1, the generation of the positive output Vop and the negative output Von are independently controlled.

Figure 2:
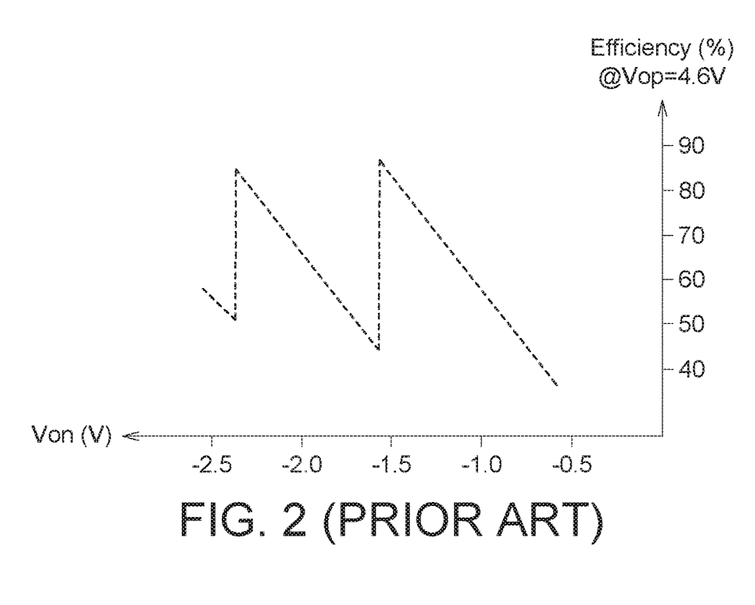
FIG. 2 (prior art) shows the conversion efficiency of the conventional two-stage SIBO converter of FIG. 1.

FIG. 2 shows the conversion efficiency of the two-stage SIBO converter 100. The conversion efficiency is defined as:

$$\text{Efficiency} = \frac{|Iop * Vop| + |Ion * Von|}{|Iin * Vin|} * 100\%$$

As shown in FIG. 2, the efficiency of the conventional two-stage SIBO converter 100 is at peak when Von=Vop*(−0.5)=4.6*(−0.5)=−2.3(V) or Von=Vop*(−0.33)=4.6*(−0.33)=−1.51(V) in case that Vop=4.6(V). However, the efficiency of the conventional two-stage SIBO converter 100 is not good when Von is neither −2.3(V) nor −1.51(V). Therefore, the efficiency of the conventional two-stage SIBO converter needs to be improved.

There is a need for providing a new SIBO converter with improved efficiency.

SUMMARY

According to one embodiment, provided is a SIBO boost converter including: a controller; an inductor, coupled to an input and the controller; a plurality of switches, coupled to the inductor and the controller; and a plurality of capacitors, coupled to the switches. In a first phase, an inductor current flows from the input to ground through the inductor and a first switch of the switches to energize the inductor. In one of second and third phases, the inductor releases energy stored thereof and the inductor current flows from the inductor to ground via a second switch of the switches and a first capacitor of the capacitors to charge the first capacitor of the capacitors and to produce a first positive output on the first capacitor. In the other one of the second and the third phases, the inductor is energized by the input and the inductor current flows from the inductor to a third capacitor of the capacitors through two third switches of the switches to charge the third capacitor and to produce a second positive output on the third capacitor. In the first phase and/or in the one of second and third phases, the third capacitor is discharged through two fourth switches of the switches to charge a second capacitor of the capacitors to produce a negative output on the second capacitor. Timing for producing the second positive output is non-overlapped with timing for producing the negative output. The first positive output and the negative output are fed back to the controller. The controller controls the switches based on the first positive output and the negative output According to another embodiment, provided is an operation method for a SIBO boost converter including an inductor, a plurality of switches and a plurality of capacitors. The operation method includes: in a first phase, conducting an inductor current from an input to ground through the inductor and a first switch of the switches to energize the inductor; in one of second and third phases, releasing energy stored in the inductor to conduct the inductor current from the inductor to ground via a second switch of the switches and a first capacitor of the capacitors to charge the first capacitor of the capacitors and to produce a first positive output on the first capacitor; in the other one of the second and the third phases, energizing the inductor by the input and conducting the inductor current from the inductor to a third capacitor of the capacitors through two third switches of the switches to charge the third capacitor and to produce a second positive output on the third capacitor; in the first phase and/or in the one of second and third phases, discharging the third capacitor through two fourth switches of the switches to charge a second capacitor of the capacitors to produce a negative output on the second capacitor, wherein timing for producing the second positive output is non-overlapped with timing for producing the negative output. The first positive output and the negative output are fed back for controlling the switches.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 3:
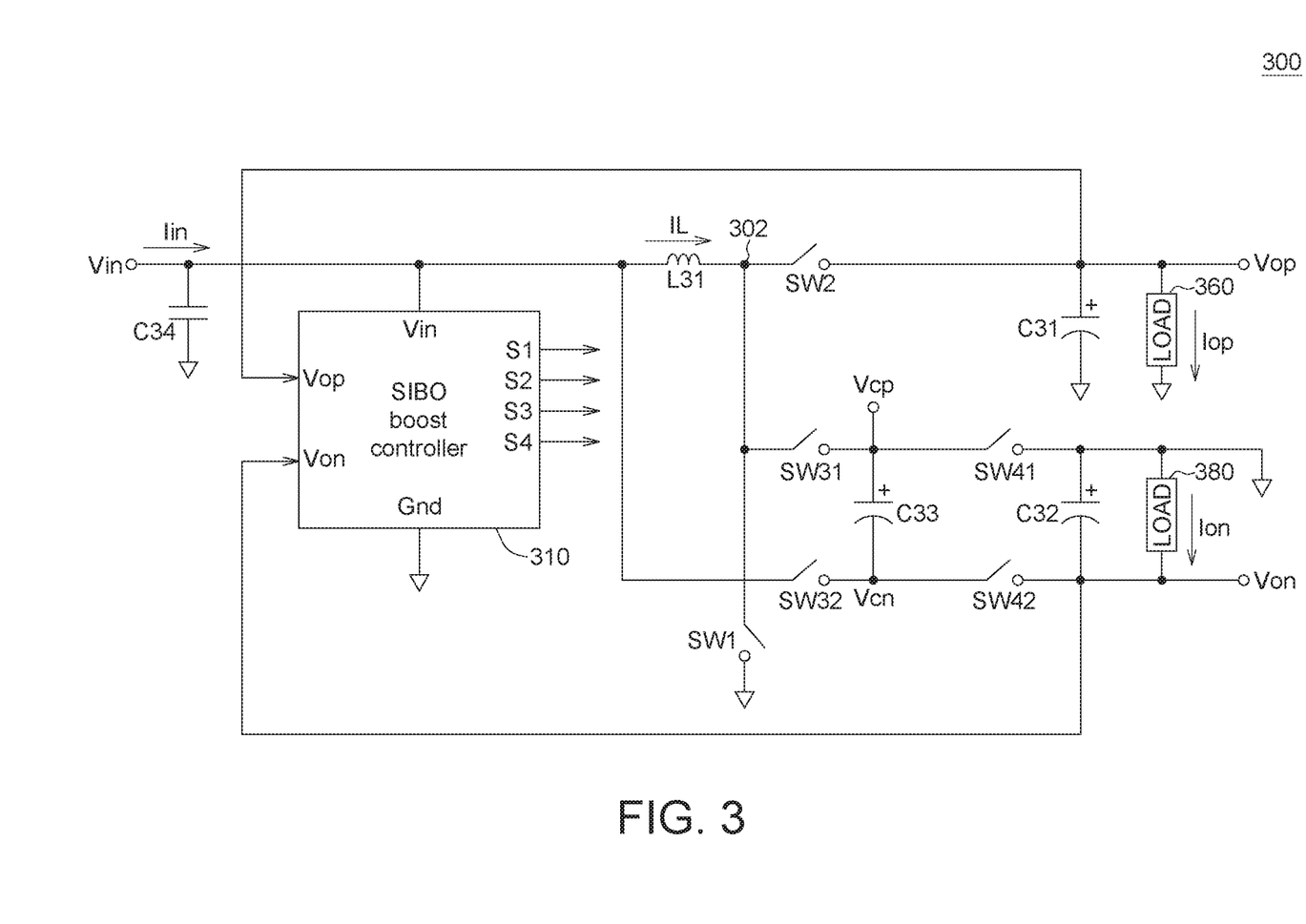
FIG. 3 shows an exemplary circuit of a new SIBO boost converter 300 according to an embodiment of the application.

FIG. 3 shows an exemplary circuit of a new SIBO (Single Inductor Bipolar Output) boost converter 300 according to an embodiment of the application. The new SIBO boost converter 300 is a single inductor bipolar output boost power stage. The SIBO boost converter 300 includes a SIBO boost controller 310, an inductor L31, switches SW1, SW2, SW31, SW32, SW41 and SW42, and capacitors C31, C32, C33 and C34. The capacitors C31, C32 and C34 are decoupling capacitors. The capacitor C33 is a fly capacitor.

The SIBO boost controller 310 is for generating control signals S1, S2, S3, and S2 based on the first positive output Vop and the negative output Von. The switch SW1 is controlled by the control signal S1. The switch SW2 is controlled by the control signal S2. The switches SW31 and SW32 are controlled by the control signal S3. The switches SW41 and SW42 are controlled by the control signal S4. The configuration of the SIBO boost controller 310 is not specified here.

The inductor L31 is coupled between an input Vin and a node 302. The switch SW1 is coupled between the node 302 and ground GND. The switch SW2 is coupled between the node 302 and a first terminal of the capacitor C31. The switch SW31 is coupled between the node 302 and a first terminal of the capacitor C33. The switch SW32 is coupled between the input Vin and a second terminal of the capacitor C33. The switch SW41 is coupled between ground GND and the first terminal of the capacitor C33. The switch SW42 is coupled between the second terminal of the capacitor C33 and the second terminal of the capacitor C32. The capacitor C34 is coupled between the input Vin and ground GND. The capacitor C31 is coupled between the switch SW2 and ground GND. The capacitor C32 is coupled between ground GND and the switch SW42. The capacitor C33 is coupled between the switches SW41 and SW42.

A first positive output Vop, which is higher than 0V, is produced on the capacitor C31. The first positive output Vop may drive the load 360 by the current Iop. A second positive output Vcp, which is higher than 0V, is produced on the capacitor C33. A negative output Von, which is lower than 0V, is produced on the capacitor C32. The negative output Von may drive the load 380 by the current Ion. Details of producing the outputs Vop, Vcp and Von are as follows.

Figure 4A:
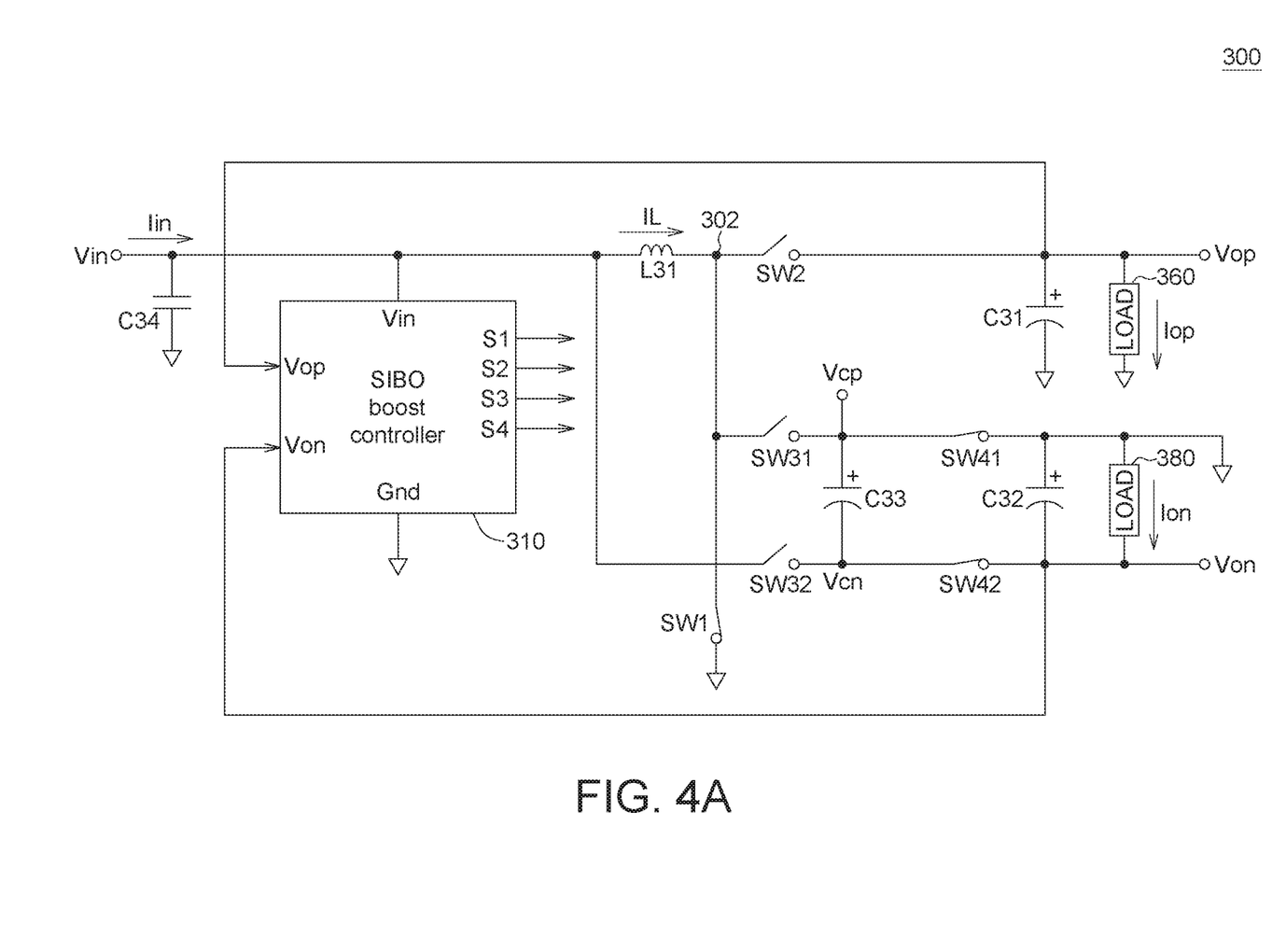
FIGS. 4A-4C show three phases of the new SIBO boost converter 300 of FIG. 3.
Figure 4B:
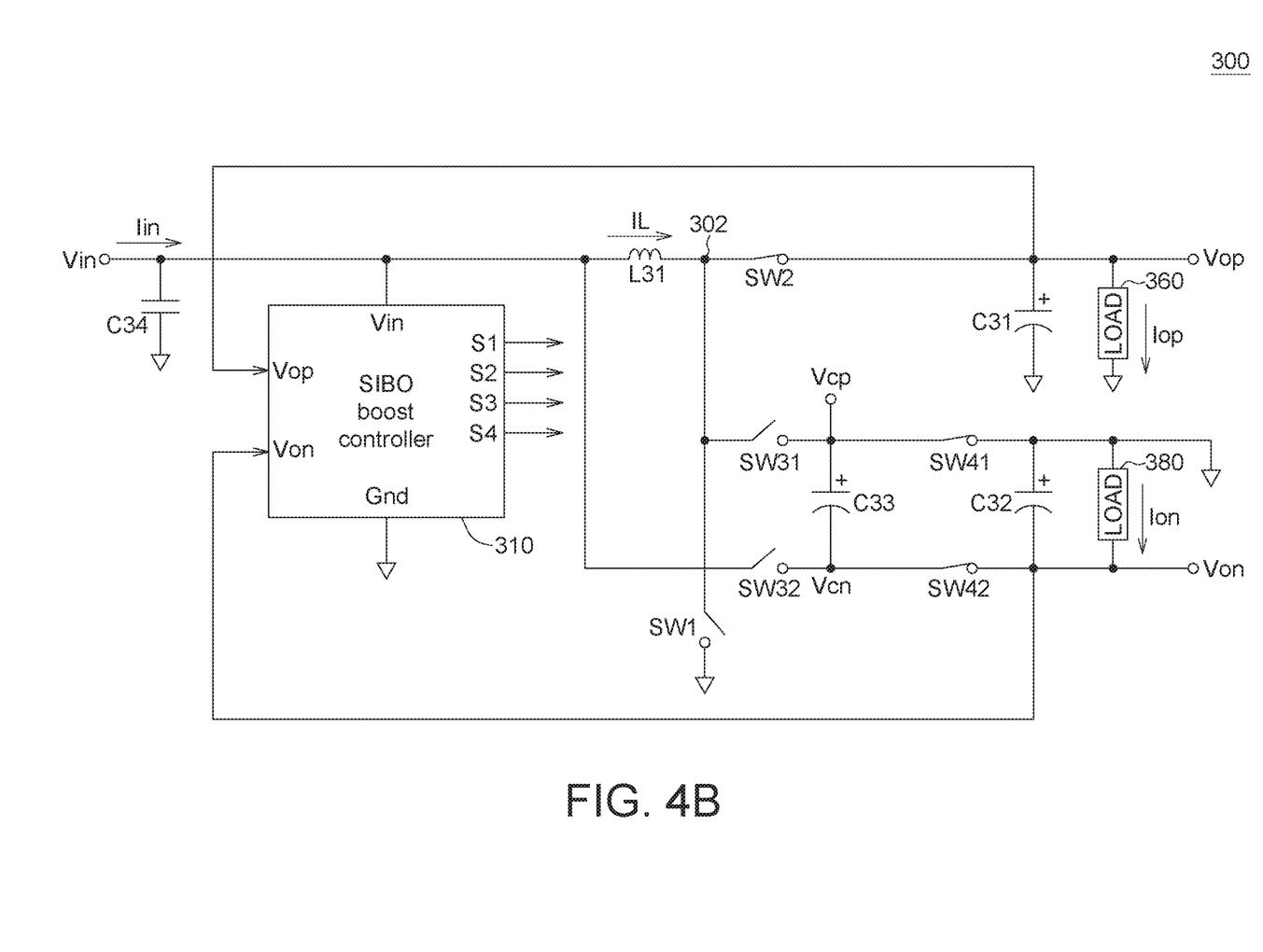
Figure 4C:
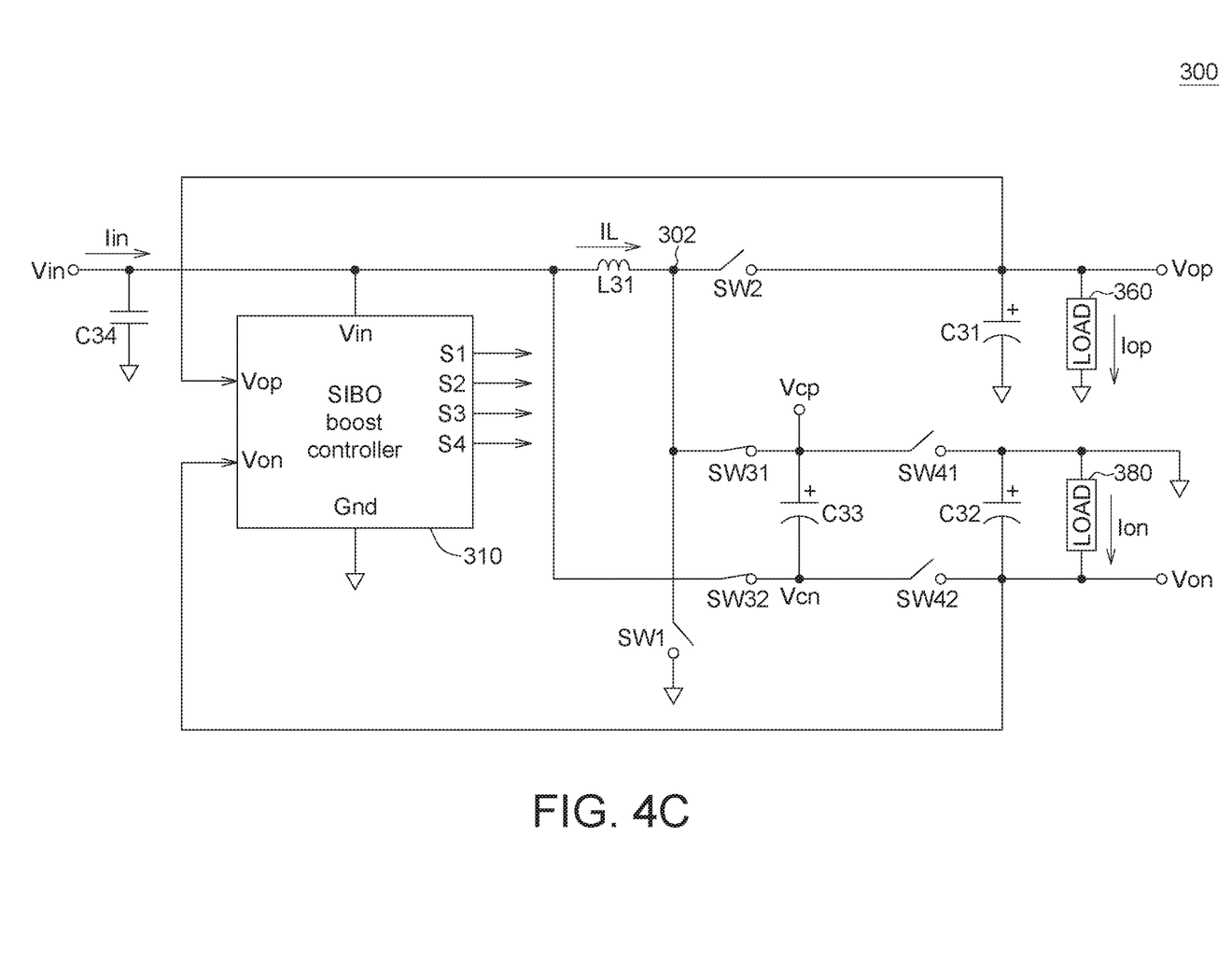
Figure 5:
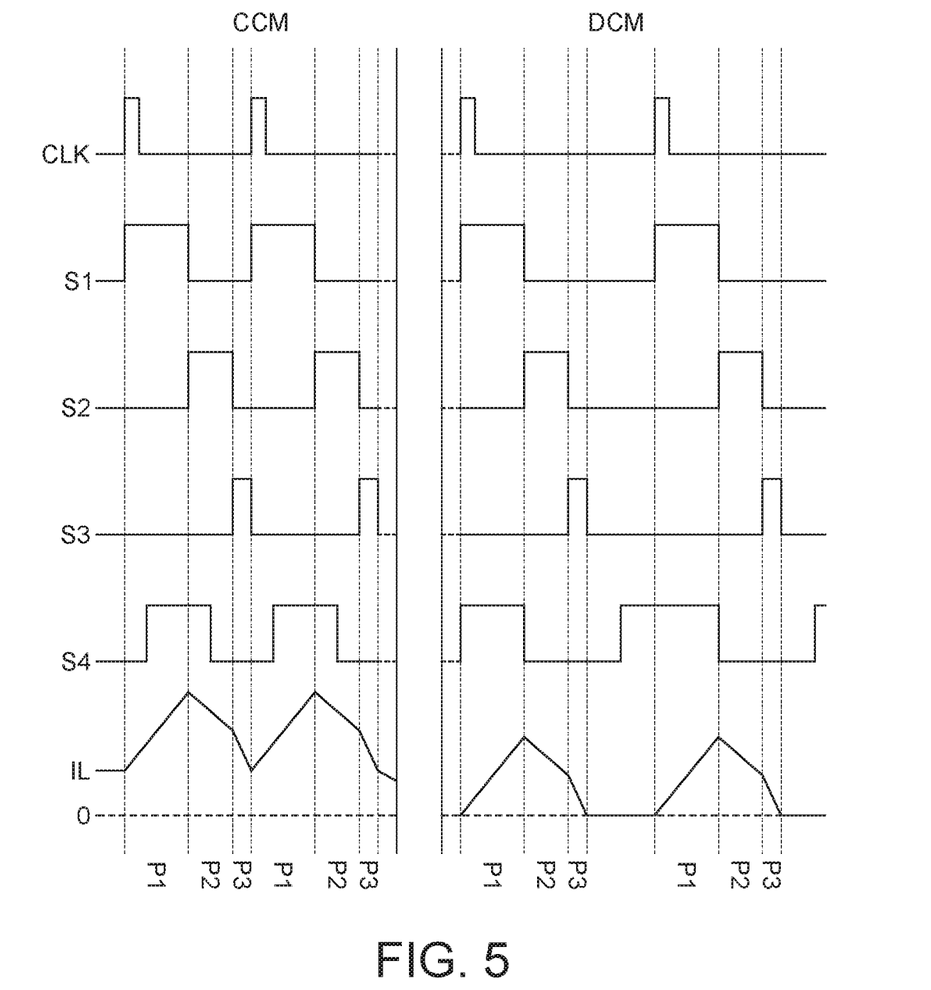
FIG. 5 shows a timing diagram of various signals in the new SIBO boost converter 300 of FIG. 3.

FIGS. 4A-4C show three phases P1-P3 of the SIBO boost converter 300. FIG. 5 shows a timing diagram of various signals in the SIBO boost converter 300.

Refer to FIG. 4A and FIG. 5. In the first phase P1, the switch SW1 turns on and the switches SW2, SW31, SW32 turn off. Therefore, an inductor current IL flows from the input Vin to ground GND through the inductor L31 and the switch SW1, by which the inductor L31 is energized.

Refer to FIG. 4B and FIG. 5. After switching to the second phase P2, the switch SW1 turns off, the switch SW2 turns on and the switches SW31, SW32 turn off. Therefore, the inductor L31 releases the energy stored thereof and the inductor current IL flows from the inductor L31 to ground GND via the switch S2 and the capacitor C31. As such, the capacitor C31 is charged and the first positive output Vop is produced thereon.

Refer to FIG. 4C and FIG. 5. After switching to the third phase P3, the switch SW1 turns off, the switch SW2 turns off and the switches SW31, SW32 turn on. Therefore, a close loop is formed. The inductor L31 is energized by the input Vin and the inductor current IL flows from the inductor L31 to the capacitor C33. As such, the capacitor C33 is charged and the second positive output Vcp is produced thereon. In the third phase P3, via feedback control, the second positive output Vcp will be boosted until a desired value. For example, if the input Vin is +3.7V, the first positive output Vop has a desired value of +4.6V, the negative output Von has a desired value of −2.4V, then, the second positive output Vcp will be +3.7V−(−2.4V)+dV=±6.1V+dV, wherein dV refers to switching and conduction loss of the switches SW41 and SW42, which dV will be ignored in the following description for simplicity.

How to generate the negative output Von is described later. In the embodiment of the application, only during the switches SW31 and SW32 turn off, the switches SW41 and SW42 are allowed to turn on. When the switches SW41 and SW42 turn on, the capacitor C33 is discharged and the capacitor C32 is charged. Because the second positive output Vcp is +6.1V and the input Vin is +3.7V, then at the third phase P3, the voltage across the capacitor C33 is 6.1V-3.7V=2.4V. When the switches SW41 and SW42 turn on for a desired time period, the voltage across the capacitor C33 and the voltage across the capacitor C32 will be the same. Thus, the negative output Von will be produced at capacitor C32, which is 0-2.4V=−2.4V (because one terminal of the second capacitor C32 is coupled to ground GND and the voltage across the capacitor C32 is 2.4V). Thus, as shown in FIG. 5, in the first phase P1 and/or in the second phase P2, the negative output Von is produced on the capacitor C32. However, in the third phase P3, because the switches SW31 and SW32 turn on, it is not allowed to turn on the switches SW41 and SW42. If the switches SW31, SW32, SW41, SW42 all turn on at the same time, then short-circuit happens. Thus, in the embodiment of the application, the timing for producing the second positive output Vcp is non-overlapped with the timing for producing the negative output Von.

As shown in FIG. 5, the new SIBO boost converter 300 has two operation modes: continuous conduction mode (CCM) and discontinuous conduction mode (DCM).

In CCM, the inductor current IL from the inductor L31 is continuous. In heavy loading, via the correct feedback control, the new SIBO boost converter 300 enters into the CCM mode.

On the contrary, in light loading, via the correct feedback control, the SIBO boost converter 300 enters into the DCM mode. In light loading, the average inductor current IL will be small and may be discharged to 0. When the average inductor current IL is close to 0, the switches SW31 and SW32 will be turned off and thus the inductor L31 is neither charged nor discharged until the next clock cycle CLK.

In other possible embodiment of the application, the phase sequence for producing the first positive output Vop and for producing the second positive output Vcp may be different from that in FIG. 4A-4C. That is, the SIBO boost converter in other possible embodiment of the application may produce the second positive output Vcp in the second phase while produce the first positive output Vop in the third phase (but the inductor L31 is energized in the first phase, and the negative output Von may be produced when the switches SW31 and SW32 turn off). This is still within the spirit and the scope of the application.

In brief, in the new SIBO boost converter of the embodiment of the application, two output voltages (i.e. the first positive output Vop and the negative output Von) are produced via one inductor, a plurality of capacitors and a plurality of switches.

Figure 6:
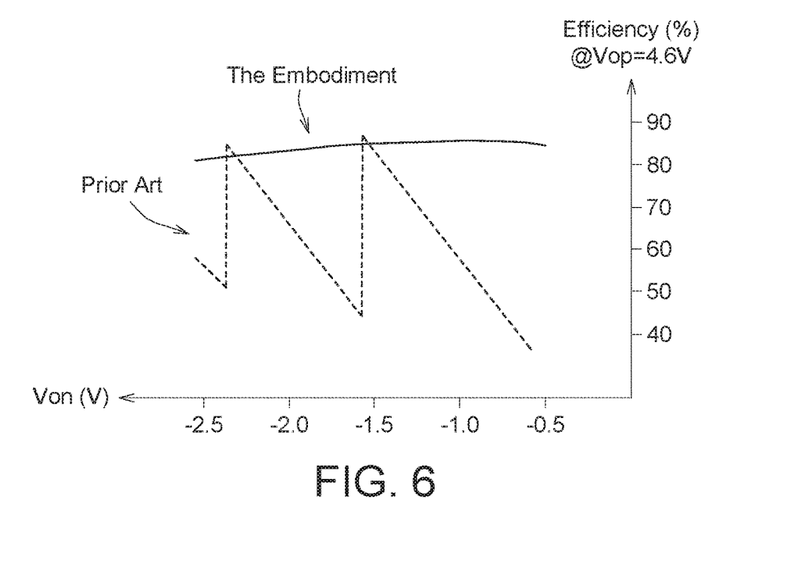
FIG. 6 shows the conversion efficiency comparison between the embodiment and the conventional two-stage SIBO converter.

As shown in FIG. 6, the embodiment has smooth and high conversion efficiency (almost between 80%-85%), compared with the efficiency of the conventional two-stage SIBO converter 100 (which is between 40%-85%). Therefore, the efficiency of the SIBO boost converter of the embodiment of the application is improved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A SIBO (Single Inductor Bipolar Output) boost converter including:
  a controller;
  an inductor, coupled to an input and the controller;
  a plurality of switches, coupled to the inductor and the controller; and
  a plurality of capacitors, coupled to the switches,
  wherein
  in a first phase, an inductor current flows from the input to ground through the inductor and a first switch of the switches to energize the inductor;
  in one of second and third phases, the inductor releases energy stored thereof and the inductor current flows from the inductor to ground via a second switch of the switches and a first capacitor of the capacitors to charge the first capacitor of the capacitors and to produce a first positive output on the first capacitor;
  in the other one of the second and the third phases, the inductor is energized by the input and the inductor current flows from the inductor to a third capacitor of the capacitors through two third switches of the switches to charge the third capacitor and to produce a second positive output on the third capacitor;
  in the first phase and/or in the one of second and third phases, the third capacitor is discharged through two fourth switches of the switches to charge a second capacitor of the capacitors to produce a negative output on the second capacitor; and
  timing for producing the second positive output is non-overlapped with timing for producing the negative output, the first positive output and the negative output are fed back to the controller, and the controller controls the switches based on the first positive output and the negative output.

2. The SIBO boost converter according to claim 1, wherein
  the first positive output is higher than 0V;
  the second positive output is higher than 0V; and
  the negative output is lower than 0V.

3. The SIBO boost converter according to claim 1, wherein
  the inductor is coupled between the input and a node;
  the first switch is coupled between the node and ground;
  the second switch is coupled between the node and a first terminal of the first capacitor;
  one of the two third switches is coupled between the node and a first terminal of the third capacitor, and the other one of the two third switches is coupled between the input and a second terminal of the third capacitor;
  one of the two fourth switches is coupled between ground and the first terminal of the third capacitor, and the other one of the two fourth switches is coupled between the second terminal of the third capacitor and a second terminal of the second capacitor;
  the first capacitor is coupled between the second switch and ground, and the first positive output is generated on a connection node between the second switch and the first capacitor;
  the second capacitor is coupled between ground and the other one of the two fourth switches, and the negative output is generated on a connection node between the second capacitor and the other one of the two fourth switches; and
  the third capacitor is coupled between the two fourth switches.

4. The SIBO boost converter according to claim 3, wherein
  in the first phase, the first switch turns on, the second switch and the two third switches turn off to energize the inductor.

5. The SIBO boost converter according to claim 3, wherein
  in the one of the second and the third phases, the first switch turns off, the second switch turns on and the two third switches turn off, for producing the first positive output on the first capacitor.

6. The SIBO boost converter according to claim 3, wherein
  in the other one of the second and the third phases, the first switch turns off, the second switch turns off and the two third switches turn on for producing the second positive output on the third voltage.

7. The SIBO boost converter according to claim 3, wherein
  in the first phase and/or in the one of second and third phases, the two third switches turn off while the two fourth switches turn on, and thus a voltage across the third capacitor and a voltage across the second capacitor are the same, to produce the negative output on the second capacitor.

8. An operation method for a SIBO boost converter including an inductor, a plurality of switches and a plurality of capacitors, the operation method including:
  in a first phase, conducting an inductor current from an input to ground through the inductor and a first switch of the switches to energize the inductor;
  in one of second and third phases, releasing energy stored in the inductor to conduct the inductor current from the inductor to ground via a second switch of the switches and a first capacitor of the capacitors to charge the first capacitor of the capacitors and to produce a first positive output on the first capacitor;

in the other one of the second and the third phases, energizing the inductor by the input and conducting the inductor current from the inductor to a third capacitor of the capacitors through two third switches of the switches to charge the third capacitor and to produce a second positive output on the third capacitor;

in the first phase and/or in the one of second and third phases, discharging the third capacitor through two fourth switches of the switches to charge a second capacitor of the capacitors to produce a negative output on the second capacitor, wherein timing for producing the second positive output is non-overlapped with timing for producing the negative output and the first positive output and the negative output are fed back for controlling the switches.

9. The operation method according to claim 8, wherein the first positive output is higher than 0V; the second positive output is higher than 0V; and the negative output is lower than 0V.

10. The operation method according to claim 8, wherein the inductor is coupled between the input and a node; the first switch is coupled between the node and ground; the second switch is coupled between the node and a first terminal of the first capacitor;
one of the two third switches is coupled between the node and a first terminal of the third capacitor, and the other one of the two third switches is coupled between the input and a second terminal of the third capacitor;
one of the two fourth switches is coupled between ground and the first terminal of the third capacitor, and the other one of the two fourth switches is coupled between the second terminal of the third capacitor and a second terminal of the second capacitor;
the first capacitor is coupled between the second switch and ground, and the first positive output is generated on a connection node between the second switch and the first capacitor;
the second capacitor is coupled between ground and the other one of the two fourth switches, and the negative output is generated on a connection node between the second capacitor and the other one of the two fourth switches; and
the third capacitor is coupled between the two fourth switches.

11. The operation method according to claim 10, wherein in the first phase, the first switch turns on, the second switch and the two third switches turn off to energize the inductor.

12. The operation method according to claim 10, wherein in the one of the second and the third phases, the first switch turns off, the second switch turns on and the two third switches turn off, for producing the first positive output on the first capacitor.

13. The operation method according to claim 10, wherein in the other one of the second and the third phases, the first switch turns off, the second switch turns off and the two third switches turn on for producing the second positive output on the third voltage.

14. The operation method according to claim 10, wherein in the first phase and/or in the one of second and third phases, the two third switches turn off while the two fourth switches turn on, and thus a voltage across the third capacitor and a voltage across the second capacitor are the same, to produce the negative output on the second capacitor.

* * * * *